US007993044B2

(12) United States Patent
Yamamoto

(10) Patent No.: US 7,993,044 B2
(45) Date of Patent: Aug. 9, 2011

(54) VEHICLE LIGHTING APPARATUS

(75) Inventor: Teruaki Yamamoto, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 153 days.

(21) Appl. No.: 12/399,550

(22) Filed: Mar. 6, 2009

(65) Prior Publication Data

US 2009/0225563 A1 Sep. 10, 2009

(30) Foreign Application Priority Data

Mar. 7, 2008 (JP) ................................ 2008-057871
Jul. 30, 2008 (JP) ................................ 2008-196061

(51) Int. Cl.
*B60Q 1/00* (2006.01)

(52) U.S. Cl. ......................... 362/519; 362/546; 362/548

(58) Field of Classification Search .................. 362/519, 362/548, 655, 656, 546; 313/318.11
See application file for complete search history.

(56) References Cited

U.S. PATENT DOCUMENTS 6,309,089 B1 * 10/2001 Yoneyama et al. ........... 362/263

FOREIGN PATENT DOCUMENTS

JP 2000-243105 A 9/2000

* cited by examiner

*Primary Examiner* — Stephen F Husar
(74) *Attorney, Agent, or Firm* — Sughrue Mion, PLLC

(57) ABSTRACT

A vehicle lighting apparatus includes a discharge bulb fixed to a reflector and a connector coupled to the plug of the discharge bulb and designed to feed power to the discharge bulb. The reflector includes a conductive film on the periphery of a bulb fitting opening for fitting the plug of the discharge bulb. The connector includes a metallic cover covering its periphery. On the conductive film of the reflector is arranged an elastic contact member composed of a conductive material for electrically connecting to the metallic cover of the connector. The elastic contact member includes a bulb pressing piece for pressing and biasing the plug of the discharge bulb toward the opposing inner peripheral wall of the bulb fitting opening.

14 Claims, 10 Drawing Sheets

VEHICLE LIGHTING APPARATUS

BACKGROUND OF THE INVENTION

1. Field of the Invention

The present invention relates to a vehicle lighting apparatus and in particular to a vehicle lighting apparatus using a discharge bulb as a light source in which noise generated when the discharge bulb is turned on is effectively shielded.

2. Background Art

In recent years, a vehicle lighting apparatus including a discharge bulb as a light source has been used. By using the discharge bulb, high luminous intensity can be obtained with smaller power consumption than a related art bulb. Such a vehicle lighting apparatus with the discharge bulb has a problem that electromagnetic noise generated by the discharge bulb has an influence on operations of various electronic circuits in a vehicle.

Thus, it has been proposed to provide electromagnetic noise shielding means on the vehicle lighting apparatus in order to protect the electronic circuits from the electromagnetic noise generated by the discharge bulb (for example, refer to Patent Reference 1).

[Patent Reference 1] JP-A-2000-243105

Patent Document 1 discloses a vehicle lighting apparatus in which a shielding effect of the electromagnetic waves is enhanced, the number of parts is reduced, and a corresponding assembly work is simplified.

The vehicle lighting apparatus includes a connector to be attached to and detached from the plug of the discharge bulb supported by a reflector. In part of the periphery of the reflector where the connector is fitted, a contact terminal part electrically connected to a conductive film (shield part) covering the reflector is provided. To the connector, a conductive cover (shield part) covering the connector is integrated. The conductive cover comes into contact with the contact terminal part with the connector fitted to the plug.

When the connector is fitted to the plug, the conductive cover is automatically brought into electric connection to a contact terminal electrically connected to the conductive film of the reflector to deliver shielding effect. This eliminates the need for independent shield parts and corresponding assembly work.

Further, when the connector is fittingly attached to the plug of the discharge bulb, the connector is fitted to the rear of the plug and rotated in a circumferential direction of the plug to integrate the plug and the connector. That is, the connector is rotated in circumferential direction to cause a contact part arranged on a peripheral surface of the conductive cover designed to cover the connector to come into contact with a contact terminal part to establish electric connection between the contact part and the contact terminal part.

However, when the connector is fitted to the plug of the discharge bulb and rotated in a locking direction, the discharge bulb is also rotated together and may be displaced from a predetermined position thus failing to obtain predetermined light distribution.

Further, a flange of the plug of a discharge bulb has a positioning notch formed thereon to fit to a positioning rib arranged in a bulb fitting opening of the reflector for positioning of the discharge bulb in the circumferential direction. A clearance is necessary between the positioning rib and the positioning notch in consideration of easy assembly.

As a result, when the connector is fitted to the plug of the discharge bulb and rotated in the locking direction, the discharge bulb is also rotated together in the circumferential direction within a range of the clearance. This causes variations in the fitting position of the discharge bulb in the circumferential direction. This could result in variations in the light distribution of the vehicle lighting apparatus despite the presence of the positioning rib.

SUMMARY OF THE INVENTION

One or more embodiments of the invention provide an excellent vehicle lighting apparatus capable of effectively shielding noise generated when a discharge bulb is turned on and preventing possible variations in the light distribution.

In accordance with one or more embodiments of the invention, a vehicle lighting apparatus is provided with: a discharge bulb fixed to a reflector; a connector coupled to a plug of the discharge bulb and for feeding power to the discharge bulb; and a bulb pressing piece provided on the reflector and for pressing and biasing the plug toward an opposing inner peripheral wall of a bulb fitting opening of the reflector to which the bulb fits.

With the vehicle lighting apparatus of this configuration, the plug of the discharge bulb is pressed and biased toward the opposing inner peripheral wall of the bulb fitting opening by the bulb pressing piece arranged on the reflector. When a connector is fitted to the plug of the discharge bulb and rotated in locking direction, the discharge bulb fitted to the bulb fitting opening is prevented from being rotated together and is thus unlikely to be displaced from a predetermined fitting position.

The vehicle lighting apparatus may further be provided with: a first shield part made of a conductive material and provided on the reflector around the bulb fitting opening; a second shield part made of a conductive material and provided on the connector to cover a periphery of the connector; and an elastic contact member made of a conductive material and provided on the first shield part to be electrically connected with the second shield part. The bulb pressing piece may be arranged on the elastic contact member.

With the vehicle lighting apparatus of this configuration, the bulb pressing piece for pressingly biasing the plug of a discharge bulb toward the opposing inner peripheral surface of a bulb fitting opening is arranged integrally with an elastic contact member including a terminal contact part. This solves the problems of an increase in the number of parts and corresponding cumbersome assembly work.

In the vehicle lighting apparatus, the bulb pressing piece may be arranged in a vicinity of a positioning rib arranged in the bulb fitting opening and may fit to a positioning notch of the discharge bulb, so as to position the discharge bulb in circumferential direction.

With the vehicle lighting apparatus of this configuration, the bulb pressing piece arranged on the elastic contact member presses and biases the plug of a discharge bulb along the protruding direction of a positioning rib extending along the axis of the bulb fitting opening and protruding radially inward. Accordingly, the bulb pressing piece thus presses and biases the plug of a discharge bulb toward the opposing inner peripheral wall of a bulb fitting opening while avoiding interference with a positioning rib.

In the vehicle lighting apparatus, the bulb pressing piece may press and bias the inner side surface of the positioning notch in a locking direction of the connector.

With the vehicle lighting apparatus of this configuration, the inner side surface of the positioning notch is pressed and biased also in the locking direction of the connector. Thus, a second inner side surface opposite to the inner side surface is always pressed against the positioning rib along the locking direction. Accordingly, the plug of the discharge bulb pressed and biased in two directions, that is, in the radial direction and circumferential direction of the bulb fitting opening, is reliably positioned in a predetermined position of the bulb fitting opening without variations in the fitting position.

Despite the clearance between the positioning rib and the positioning notch, the plug of the discharge bulb fitted to the bulb fitting opening is positioned in circumferential direction while the inner surface of the positioning notch is always pressed against the positioning rib. When the connector is rotated in locking direction, the discharge bulb is prevented from being rotated together by the positioning rib.

In the vehicle lighting apparatus, the elastic contact member may include: a terminal fixing part fixed to the first shield part; and a terminal contact part in contact with the second shield part in an elastically deformed state. The terminal contact part may include a plurality of flexible pieces respectively having contacts at tips thereof.

With the vehicle lighting apparatus of this configuration, respective flexible pieces of the terminal contact part are elastically deformed in an independent way with respect to the shield part of the connector to cause the contacts to be electrically connected. This reliably brings the plurality of contacts in electric connection to the shield part of the connector thus enlarging the conduction area for reduction of noise.

In the vehicle lighting apparatus, the bulb pressing piece may include a bent part whose tip is bent toward the positioning rib.

With the vehicle lighting apparatus of this configuration, the plug of the discharge bulb is inserted into the bulb fitting opening so that the bent part of the bulb pressing piece is in elastic contact with the bottom surface of the positioning notch and its tip is pressed against the positioning rib.

Compared with a bulb pressing piece in the shape of a simple cantilever, a bulb pressing piece in the shape of a cantilever including a bent part has an increased pressing force to press and bias the plug of a discharge bulb toward the opposing inner peripheral wall of a bulb fitting opening. The tip of the bulb pressing piece is elastically deformed after contact with the positioning rib to accommodate variations in the dimension of a discharge bulb.

With the vehicle lighting apparatus of this configuration, the discharge bulb fitted to a bulb fitting opening is prevented from being rotated together and is unlikely to be displaced from a predetermine position when a connector is fitted to the plug of a discharge bulb and rotated in locking direction.

This prevents the discharge bulb from being rotated together with the connector and being displaced from a predetermined position thereby preventing variations in the light distribution of a vehicle lighting apparatus.

This provides an excellent vehicle lighting apparatus capable of effectively shielding noise generated when a discharge bulb is turned on and preventing possible variations in the light distribution.

Other aspects and advantages of the invention will be apparent from the following description, the drawings and the claims.

DETAILED DESCRIPTION OF THE EXEMPLARY EMBODIMENTS

Exemplary embodiments of a vehicle lighting apparatus according to the invention will be detailed based on the appended drawings.

Figure 1:
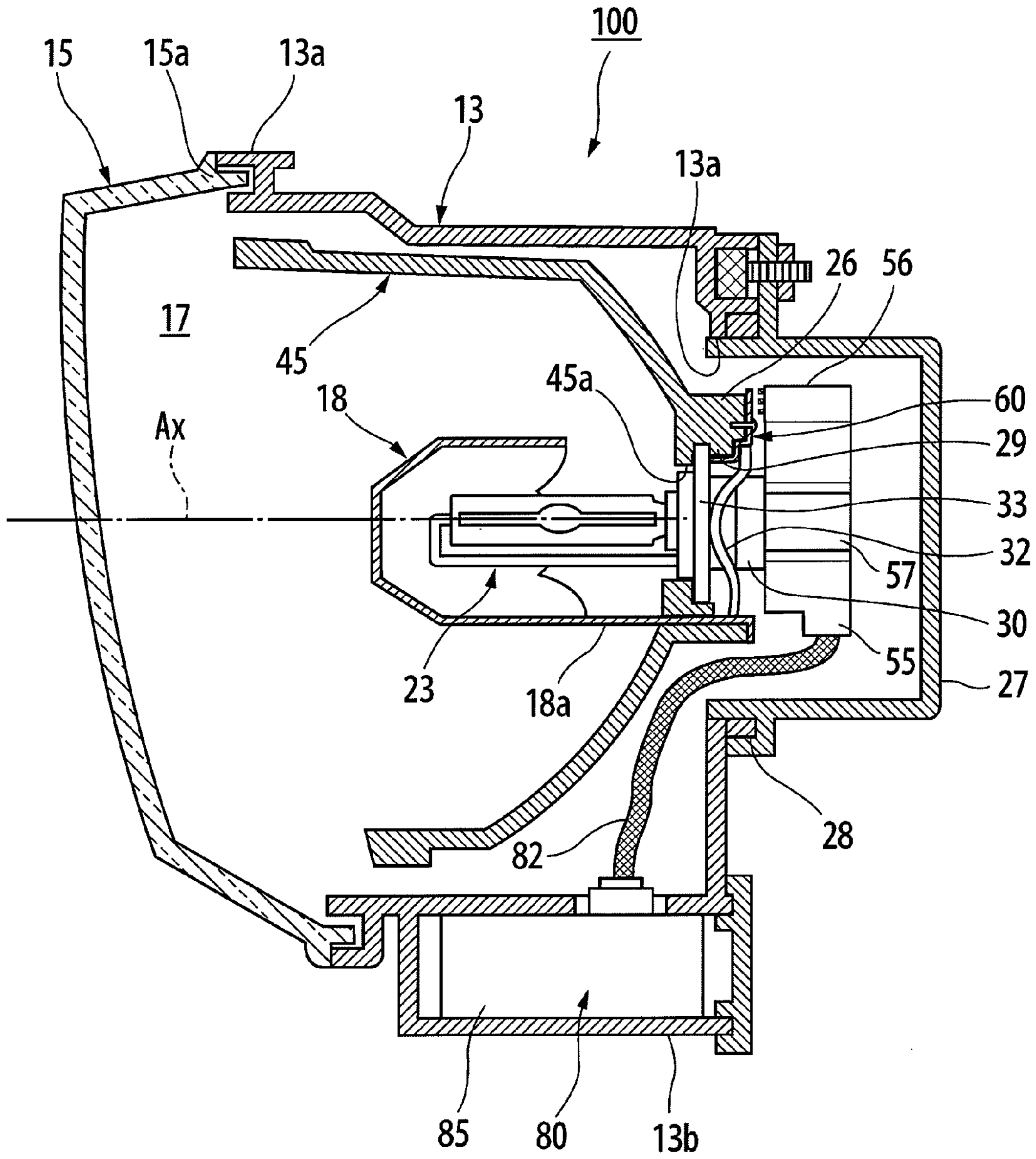
FIG. 1 is a vertical cross-sectional view of a vehicle lighting apparatus according to a first embodiment of the invention.
Figure 2:
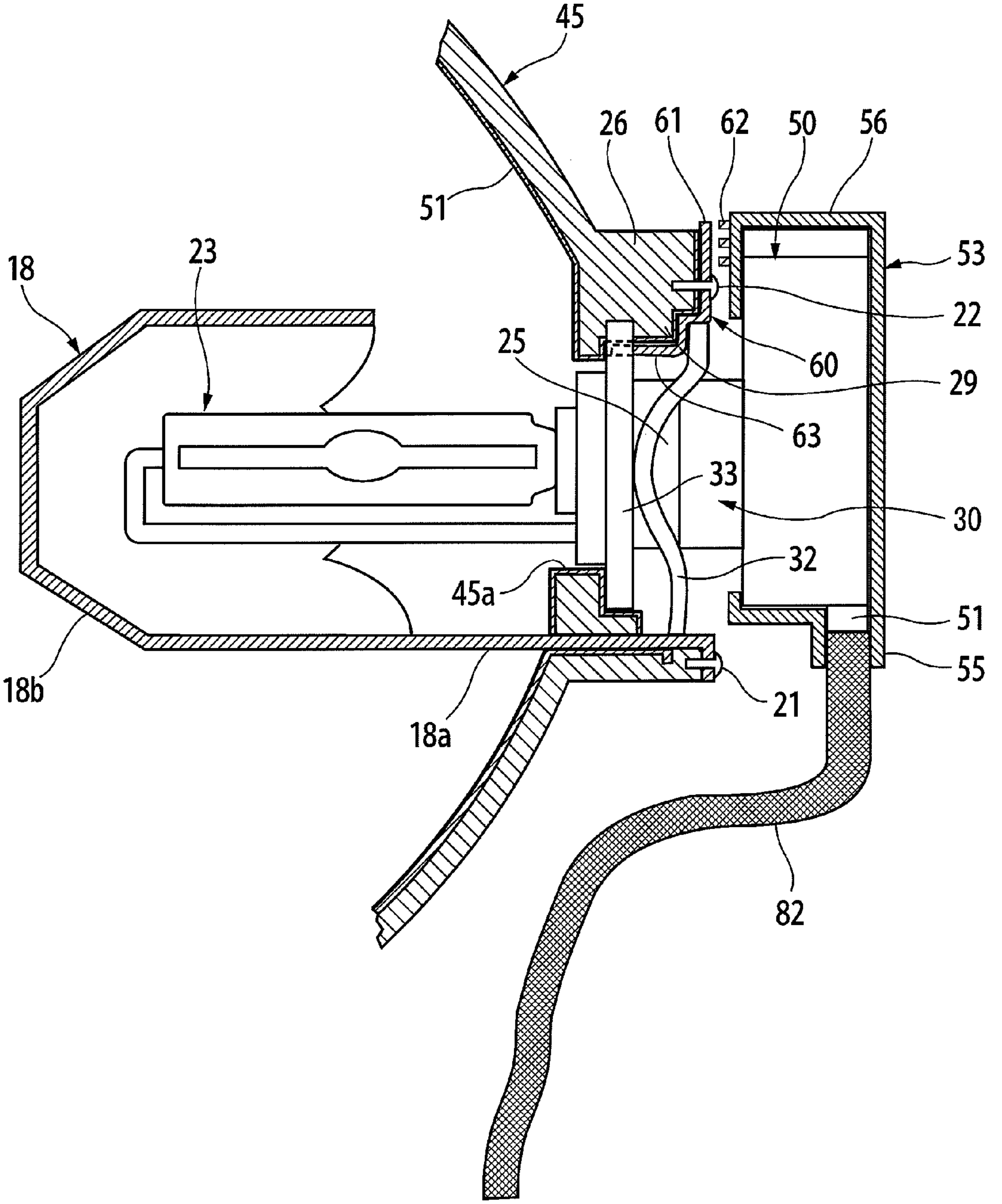
FIG. 2 is an enlarged view of key parts of the vehicle lighting apparatus shown in FIG. 1.
Figure 3:
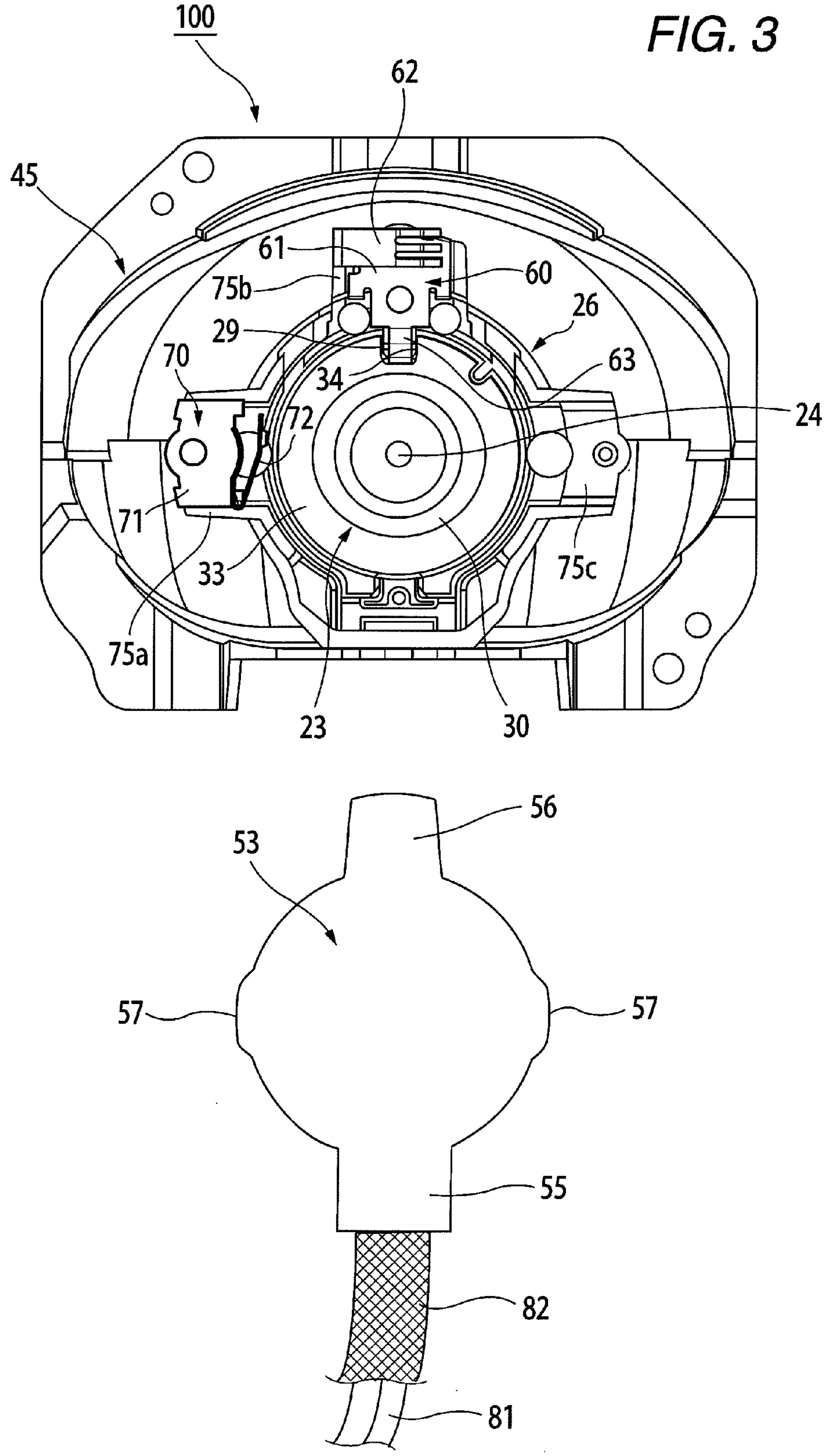
FIG. 3 is a rear view of the vehicle lighting apparatus shown in FIG. 1 to which a discharge bulb is fitted.

FIG. 1 is a vertical cross-sectional view of a vehicle lighting apparatus according to a first embodiment of the invention. FIG. 2 is an enlarged view of key parts of the vehicle lighting apparatus shown in FIG. 1. FIG. 3 is a rear view of the vehicle lighting apparatus shown in FIG. 1 to which a discharge bulb is fitted.

A vehicle lighting apparatus 100 according to the first embodiment is a headlamp unit forming a high-beam light distribution pattern. As shown in FIG. 1, the vehicle lighting apparatus 100 includes a lamp body 13 having a front opening and a translucent front cover 15 mounted on the lamp body 13 so as to cover the front opening. The front cover 15 is mounted on the lamp body with its peripheral edge 15*a* fitted to the peripheral edge 13*a* of the front opening.

In the lamp chamber 17 segmented and formed by the lamp body 13 and the front cover 15 is arranged a reflector 45 in the shape of a substantially rotary parabolic surface by an aiming mechanism (not shown). To a bulb fitting opening 45*a* arranged in the rear center of the reflector 45 is detachably fitted a discharge bulb 23. To the plug 30 of the discharge bulb 23 is connected a connector 50 described later. The plug 30 is a conductive part of the discharge bulb 23 and a connection part to the connector 50.

In the rear surface of the lamp body 13 opposed to the discharge bulb 23 is arranged an opening 13*a* for inserting a bulb. The discharge bulb 23 may be attached/detached through the opening 13*a*. To the opening 13*a* is attached a detachable back cover 27 via a seal ring 28, which seals the opening 13*a* in a watertight state.

While not shown, on the inner surface of each of the lamp body 13 and back cover 27 is applied or evaporated a conductive film made of aluminum or the like, which serves as a shield film for electromagnetically shielding the interior of the lamp body 13.

As shown in FIGS. 1 to 3, on the rear surface of the reflector 45 to which the discharge bulb 23 is fitted is integrally formed an annular peripheral wall 26 surrounding the bulb fitting opening 45*a*. On the rear side of the bulb fitting opening 45*a* is bridged a retainer spring 32.

The retainer spring 32 is composed of a wire spring bent in a substantially U shape and its center part is rotatably supported by a hook arranged on the peripheral wall 26. The tips of two branches of the retainer spring 32 are respectively engaged to the hooks 65 of an elastic contact member 60 fixed to the peripheral wall 26.

The peripheral wall 26 guides the peripheral surface of the plug 30. In the region from the inner surface of the reflector 45 to the surface of the peripheral wall 26, a conductive film 51 (a first shield part) made by applying or evaporating a metal such as aluminum (refer to FIG. 2) is formed. The conductive film 51 constitutes a reflective surface for light emitted from the discharge bulb 23 and forms a shield part from the inner surface of the reflector 45 to the surface of the peripheral wall 26.

On the rear surface of the peripheral wall 26 in the lower section in the figure is fixed with a screw 21 the tip of the stem 18*a* of a shade 18 that penetrates the reflector 45 mentioned later. On the rear surface of the peripheral wall 26 are fixed with screws 22 elastic contact members 60, 70.

Figure 4:
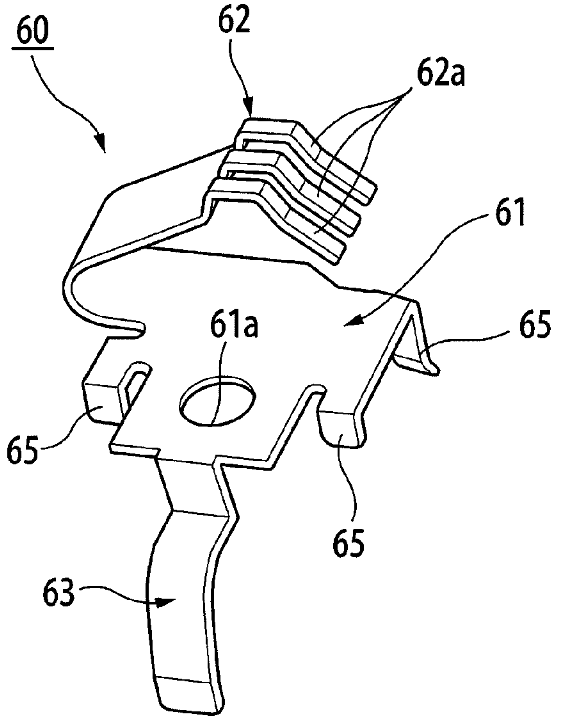
FIG. 4 is a general perspective view of the elastic contact member shown in FIG. 3.

As shown in FIG. 4, the elastic contact member 60 is made by machining a metallic plate having spring characteristics. The elastic contact member 60 includes a terminal fixing part 61 fixed on the conductive film 51 of the peripheral wall 26, hooks 65 respectively protruding downward from both sides of the terminal fixing part 61, a terminal contact part 62 in contact, in an elastically deformed state, with the front surface of a metallic cover 53 as a shield part of a connector 50 (a second shield part) described later, and a bulb pressing piece 63 for pressing and biasing the plug 30 toward the opposing inner peripheral wall of the bulb fitting opening 45*a*.

On the elastic contact member 60, while the terminal fixing part 61 is fixed on the peripheral wall 26 with the screw 22 penetrating the screw hole 61*a*, the terminal contact part 62 is elastically deformable along the optical axis Ax of the vehicle lighting apparatus 100. The bulb pressing piece 63 protrudes in the radial direction of the bulb fitting opening 45*a* and is bent in a substantially L shape in the direction of the optical axis Ax.

As shown in FIG. 3, the elastic contact member 60 according to this embodiment is fitted to a fitting part 75*b* positioned in the upper part of the peripheral wall 26 among the three fitting parts 75*a*, 75*b* and 75*c* arranged on the peripheral wall 26 of the reflector 45. Adjacent to the fitting part 75*b* is a positioning rib 29 arranged in the bulb fitting opening 45*a* in order to position the discharge bulb 23 in circumferential direction. The elastic contact member 60 is arranged near the positioning rib 29.

The bulb pressing piece 63 of the elastic contact member 60 extends along the inner surface wall of the positioning rib 29 extending along the axis of the bulb fitting opening 45*a* and presses and biases the plug 30 of the discharge bulb 23 along the protruding direction of the positioning rib 29 protruding radially inward.

Further, the terminal contact part 62 of the elastic contact member 60 is formed by a plurality of (three in this embodiment) flexible pieces 62*a* having contacts at respective tips.

Figure 5:
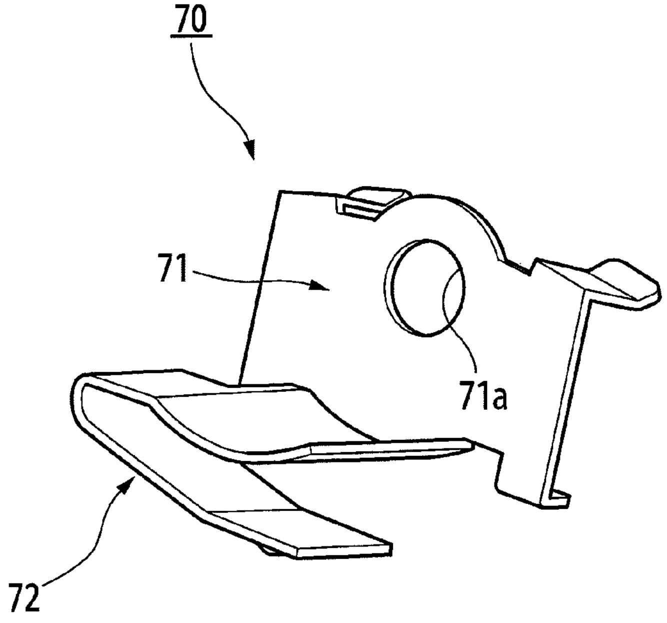
FIG. 5 is a general perspective view of the elastic contact member shown in FIG. 3.

As shown in FIG. 5, the elastic contact member 70 is made by machining a metallic plate having spring characteristics. The elastic contact member 70 includes a terminal fixing part 71 fixed on the conductive film 51 of the peripheral wall 26 and a terminal contact part 72 in contact, in an elastically deformed state, with the peripheral surface of a metallic cover 53 as a shield part of the connector 50.

On the elastic contact member 70, while the terminal fixing part 71 is fixed on the peripheral wall 26 with the screw 22 penetrating the screw hole 71*a*, the terminal contact part 72 is bent along a direction orthogonal to the optical axis Ax of the vehicle lighting apparatus 100 in an elastically deformable way.

As shown in FIG. 3, the elastic contact member 70 according to this embodiment is fitted to a fitting part 75*a* positioned on the side of the peripheral wall 26 among the three fitting parts 75*a*, 75*b*, 75*c* arranged on the peripheral wall 26 of the reflector 45 although the elastic contact member 70 may be also fitted to the fitting part 75*c*. In other words, as the number of elastic contact members 60, 70 increases for electrically connecting the conductive film 51 of the reflector 45 and the metallic cover 53 of the connector 50, conduction is more likely and a higher shielding effect is obtained.

As shown in FIGS. 2 and 3, on the discharge bulb 23, an arc tube having a pair of electrodes is erected on the front surface of the cylindrical plug 30. Each electrode covered with a shroud is electrically connected to a central terminal part 24 arranged on the rear surface of the plug 30 and an annular terminal part 25 formed on the outer peripheral surface of the plug 30. The central terminal part 24 and the annular terminal part 25 serve as the feeding terminals of the discharge bulb 23.

To the plug 30 is integrated a flange 33 having a larger outer diameter dimension at the front surface region. On the flange 33 is formed a positioning notch 34 fitted to the positioning rib 29 to position the discharge bulb 23 in circumferential direction. The positioning notch 34 includes a pair of inner surfaces opposed to each other on both side walls of the positioning rib 29 and a bottom surface opposed to the inner surface wall of the positioning rib 29 and has a small clearance with respect to the positioning rib 29 in consideration of ease of assembly.

On the front side of the reflector 45 to which the discharge bulb 23 is fitted is arranged a shade 18 composed of a metallic material. Below the shield part 18*b* of the metallic shade 18 in radial direction is integrally arranged a stem 18*a* extending straight in the direction of the rear surface of the lighting apparatus. The tip of the stem 18*a* is inserted along one side of the bulb fitting opening 45*a* from the front of the reflector 45 and fixed to the peripheral wall 26 with a screw 21.

To the connector 50 fittingly attached to the plug 30 of the discharge bulb 23 is connected a high voltage cord 81 drawn from a lighting circuit 80. When the connector 50 is fitted to the plug 30, electric connection is established to the central terminal part 24 as the feeding terminal of the discharge bulb 23 so as to apply a high voltage to the discharge bulb 23. The high voltage cord 81 is inserted into a shield cylinder 82 made of a metal net formed into a cylinder for shield thereof.

A metallic cover 53 made by machining a metallic material is arranged so as to cover the connector 50. As shown in FIG. 2, the metallic cover 53 is closely attached to the rear side of the connector 50 and its opening edge is slightly bent inward at the front periphery of the connector 50 to integrate the metallic cover 53 with the connector 50.

On a portion of the metallic cover 53 in circumferential direction is integrally arranged a sleeve 55 in the shape of a square cylinder. A caulking piece extending from the sleeve 55 is squeezed so as to surround the high voltage cord 81 and the shield cylinder 82 thus caulking the terminal of the shield cylinder 52 to the cord drawing part 51 of the connector 50 and electrically connecting the shield cylinder 52 and the metallic cover 53. On the side peripheral wall of the metallic cove 53 are formed a plurality of contact parts 56, 57. The contact parts 56, 57 are formed in a convex shape bulging outward in radial direction.

As shown in FIG. 1, the lighting circuit 80 to which the other end of the high voltage cord 81 is connected and which feeds a high voltage to the discharge bulb 23 is housed in a metallic lighting circuit case 85. The lighting circuit case 85 is stored in a storage part 13*b* segmented and formed on the inner bottom surface of the lamp body 13.

Next, the procedure for assembling the discharge bulb 23 to the vehicle lighting apparatus 100 according to the first embodiment will be described.

On the vehicle lighting apparatus 100 described above, the discharge bulb 23 is inserted into the bulb fitting opening 45*a* from the rear side of the reflector 45 and the flange 33 of the plug 30 of the discharge bulb 23 abuts against the rear surface of the reflector 45.

In this case, the plug 30 is inserted into the bulb fitting opening 45*a* so that the positioning notch 34 of the flange 33 will be fitted to the positioning rib 29 arranged in the bulb fitting opening 45*a*. This positions the discharge bulb 23 in circumferential direction by way of a pair of inner side surfaces of the positioning notch 34 opposed respectively to both side walls of the positioning rib 29.

To the bottom surface of the positioning notch 34 opposed to the inner surface wall of the positioning rib 29 is applied a pressing/biasing force downward as shown in FIG. 3 by the bulb pressing piece 63 arranged on the elastic contact member 60. The plug 30 of the discharge bulb 23 is thus pressed and biased toward the opposing inner peripheral wall (lower inner peripheral wall shown in FIG. 3) of the bulb fitting opening 45*a*.

Then, the tips of two branches of the retainer spring 32 rotatably supported by the peripheral wall 26 are engaged to the hooks 65 of the elastic contact member 60. This causes two branches of the retainer spring 32 to come into elastic contact with the rear surface of the flange 33 of the plug 30 and the elastic pressing force brings the plug 30 into elastic contact with the rear surface of the reflector 45 thereby fixedly supporting the discharge bulb 23 on the reflector 45.

The fixedly supporting structure of the discharge bulb 23 described above brings the annular terminal part 25 arranged on the plug 30 of the discharge bulb 23 into electric connection to the conductive film 51 of the reflector 45 and with the elastic contact member 60 via the retainer spring 32 and the hooks 65.

Next, the connector 50 is fittingly attached to the plug 30 of the discharge bulb 23. The fitting attachment procedure uses a known fitting technique whereby the connector 50 is fitted to the rear of the plug 30 and rotated in its circumferential direction to integrate both members.

In the procedure, the connector 50 is pressed into the rear of the plug 30 in fitting direction to bring the front surface of the contact part 56 arranged on the peripheral surface of the metallic cover 53 covering the connector 50 into contact with the terminal contact part 62 of the elastic contact member 60.

The connector 50 is rotated in locking direction (clockwise in FIG. 3) to bring the peripheral surface of the contact part 57 of the metallic cover 53 covering the connector 50 into contact with the terminal contact part 72 of the elastic contact member 70. This contact is stable since the terminal contact part 72 comes into contact with the contact part 57 while being elastically deformed with the rotation of the connector 50.

This brings the metallic cover 53 in electric connection to the elastic contact members 60, 70.

The bulb pressing piece 63 arranged on the elastic contact member 60 presses and biases the plug 30 of the discharge bulb 23 downward toward the opposing inner peripheral wall of the bulb fitting opening 45*a*. When the connector 50 is fitted to the plug 30 of the discharge bulb 23 and rotated in locking direction, the discharge bulb 23 fitted to the bulb fitting opening 45*a* is prevented from being rotated together and is thus unlikely to be displaced from a predetermined position.

The bulb pressing piece 63 of the elastic contact member 60 may press and bias the plug 30 of the discharge bulb 23 along the protruding direction of the positioning rib 29 extending along the axis of the bulb fitting opening 45*a* and protruding radially inward.

The bulb pressing piece 63 thus presses and biases the plug 30 of the discharge bulb 23 toward the opposing inner peripheral wall of the bulb fitting opening 45*a* while avoiding interference with the positioning rib 29.

With the vehicle lighting apparatus 100 thus assembled, the lighting circuit 80 is shielded by the metallic lighting circuit case 85 so that electromagnetic waves are not radiated from the lighting circuit 80. The high voltage cord 81 drawn from the lighting circuit case 85 and extending to the discharge bulb 23 is shielded by the shield cylinder 82, which prevents electromagnetic radiation from the high voltage cord 81.

On the discharge bulb 23, the connector 50 fitted to the plug 30 in a closely attaching fashion is covered and shielded by the metallic cover 53, which prevents electromagnetic radiation from the plug 30 and the connector 50. The periphery of the discharge bulb 23 is covered by the conductive film 51 formed on the reflector 45. The metallic shade 18 is arranged in front of the discharge bulb 23 to partially cover the front of the discharge bulb 23.

The metallic shade 18, the conductive film 51 on the inner surface of the reflector 45, and the annular terminal part 25 of the plug 30 of the discharge bulb 23 are electrically connected to the elastic contact member 60 via the retainer spring 32, to the metallic cover 53 and the shield cylinder 82 from the elastic contact members 60, 70, and finally to a ground circuit (not shown) of the lighting circuit 80.

This places all the conductive films surrounding the discharge bulb 23 and the plug 30 at a ground potential. The corresponding shield effect prevents electromagnetic waves generated on the discharge bulb 23 from being radiated around the lighting apparatus.

With the vehicle lighting apparatus 100 according to this embodiment, the bulb pressing piece 63 arranged on the elastic contact member 60 presses and biases the plug 30 of the discharge bulb 23 toward the opposing inner peripheral wall of the bulb fitting opening 45*a*. When the connector 50 is fitted to the plug 30 of the discharge bulb 23 and rotated in locking direction, the discharge bulb 23 fitted to the bulb fitting opening 45*a* is prevented from being rotated together and is thus unlikely to be displaced from a predetermined position.

This prevents the discharge bulb 23 from being rotated together with the connector 50 and being displaced from a predetermined position and also prevents variations in the light distribution from the vehicle lighting apparatus 100.

The bulb pressing piece 63 is integrally formed with the elastic contact member 60 having a terminal contact part 62, which prevents an increase in the number of parts in the vehicle lighting apparatus and corresponding cumbersome assembly work.

As a result, it is possible to provide an excellent vehicle lighting apparatus 100 capable of effectively shielding noise generated when the discharge bulb 23 is turned on and preventing possible variations in the light distribution.

Figure 6:
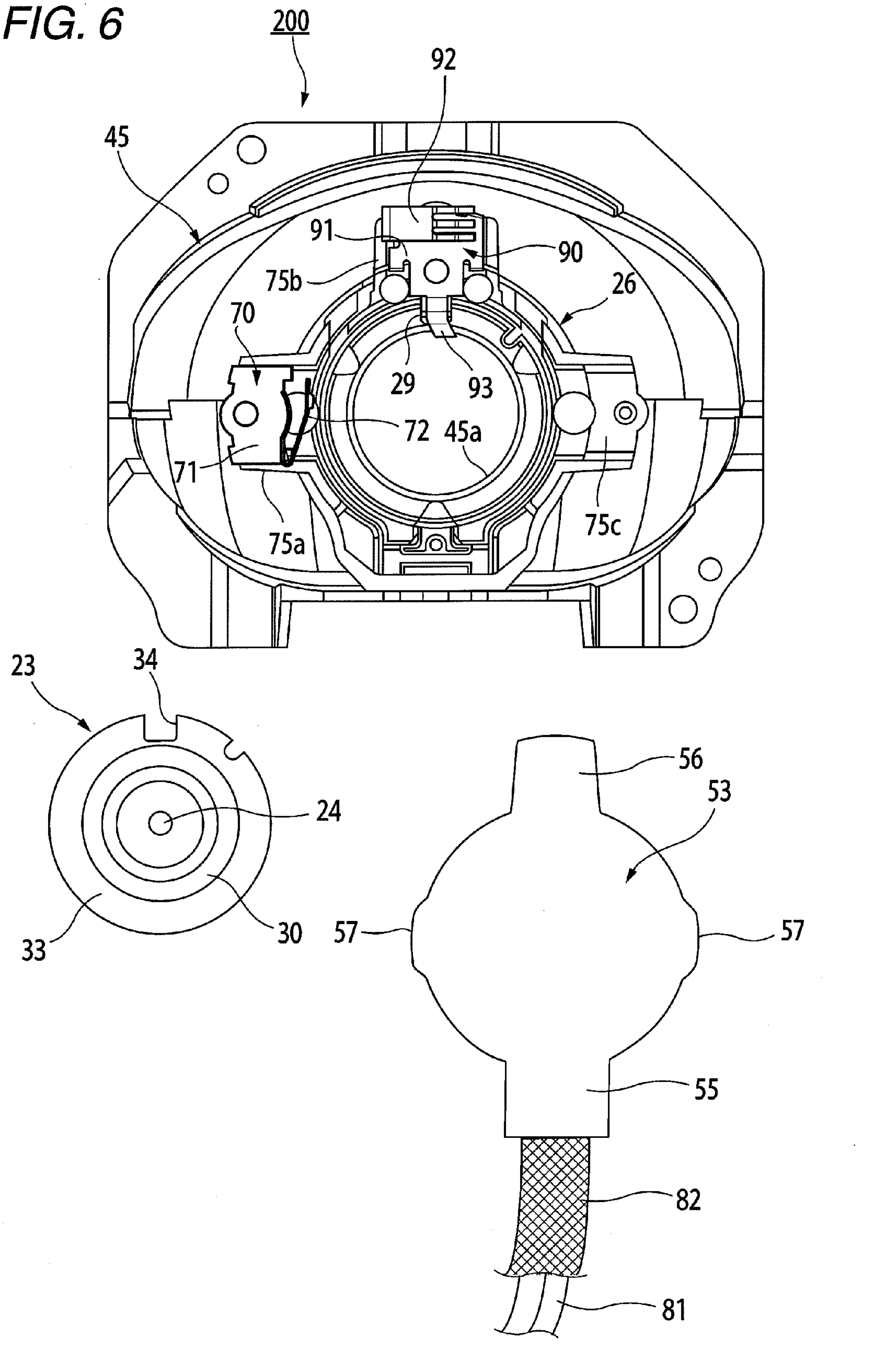
FIG. 6 is a rear view of a vehicle lighting apparatus according to a second embodiment before a discharge bulb is fitted.
Figure 7:
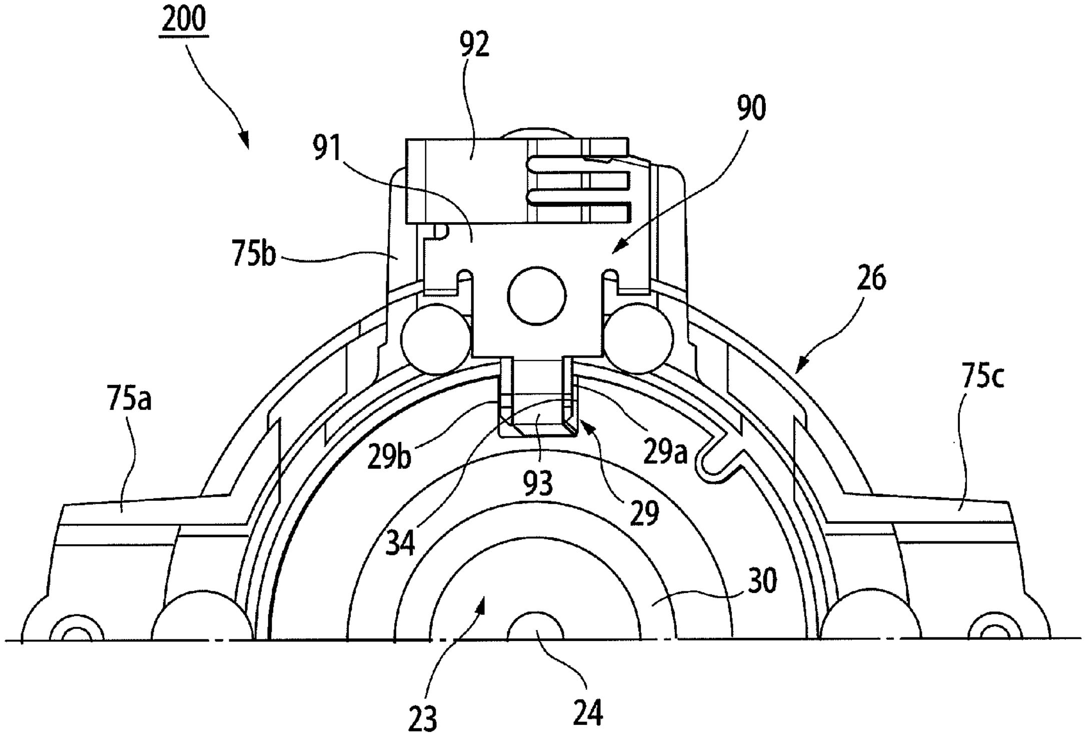
FIG. 7 is an enlarged view of key parts of the vehicle lighting apparatus shown in FIG. 6 after the discharge bulb is fitted.

FIG. 6 is a rear view of a vehicle lighting apparatus according to a second embodiment before a discharge bulb is fitted. FIG. 7 is an enlarged view of key parts of the vehicle lighting apparatus shown in FIG. 6 after the discharge bulb is fitted. Note that a vehicle lighting apparatus 200 according to the second embodiment has the same configuration as that of the vehicle lighting apparatus 100 according to the first embodiment except that an elastic contact member 90 is used instead of the elastic contact member 60, so that the same member is given the same sign and corresponding details are omitted.

Figure 8:
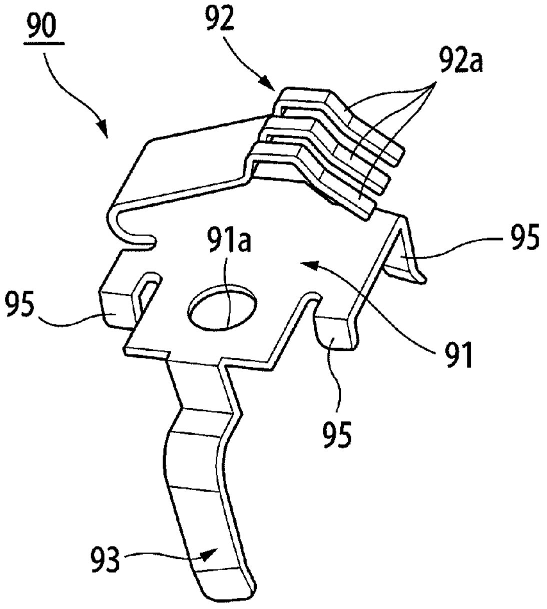
FIG. 8 is a general perspective view of the elastic contact member shown in FIG. 6.

As shown in FIG. 8, the elastic contact member 90 according to this embodiment is made by machining a metallic plate having spring characteristics. The elastic contact member 90 includes a terminal fixing part 91 fixed on the conductive film 51 of the peripheral wall 26, hooks 95 respectively protruding downward from both sides of the terminal fixing part 91, a terminal contact part 92 in contact, in an elastically deformed state, with the front surface of a metallic cover 53 as a shield part of a connector 50, and a bulb pressing piece 93 for pressing and biasing a plug 30 toward the opposing inner peripheral wall of the bulb fitting opening 45*a*.

On the elastic contact member 90, while the terminal fixing part 91 is fixed on the peripheral wall 26 with the screw 22 penetrating the screw hole 91*a*, the terminal contact part 92 is elastically deformable along the optical axis Ax of the vehicle lighting apparatus 200. The bulb pressing piece 93 protrudes in the radial direction of the bulb fitting opening 45*a* and is bent in a substantially L shape in the direction of the optical axis Ax.

The bulb pressing piece 93 has a tip bent in the locking direction of the connector 50 (clockwise in FIG. 7).

The bulb pressing piece 93 has only to press and bias the inner side surface of the positioning notch 34 in the locking direction of the connector 50 and may take various shapes. For example, a projection protruding in locking direction may be integrated at the tip.

As shown in FIG. 6, the elastic contact member 90 according to this embodiment is also fitted to a fitting part 75*b* positioned in the upper part of the peripheral wall of the reflector 45. The elastic contact member 90 is arranged near the positioning rib 29.

The bulb pressing piece 93 of the elastic contact member 90 extends along the inner surface wall of the positioning rib 29 extending along the axis of the bulb fitting opening 45*a* and presses and biases the plug 30 of the discharge bulb 23 along the protruding direction of the positioning rib 29 protruding radially inward.

Further, the tip of the bulb pressing piece 93 is bent in locking direction and thus presses and biases the plug 30 of the discharge bulb 23 in the locking direction of the connector 50.

Note that the terminal contact part 92 of the elastic contact member 90 is also formed by a plurality of (three in this embodiment) flexible pieces 92*a* having contacts at respective tips.

Next, the procedure for assembling the discharge bulb 23 to the vehicle lighting apparatus 200 according to the second embodiment will be described.

On the vehicle lighting apparatus 200 described above also, when the discharge bulb 23 is inserted into the bulb fitting opening 45*a* from the rear side of the reflector 45, the discharge bulb 23 is positioned in circumferential direction by a pair of inner side surfaces of the positioning notch 34 opposed to both side walls of the positioning rib 29.

To the bottom surface of the positioning notch 34 opposed to the inner surface wall of the positioning rib 29 is applied a pressing/biasing force downward as shown in FIG. 7 by the bulb pressing piece 93 arranged on the elastic contact member 90. The plug 30 of the discharge bulb 23 is thus pressed and biased toward the opposing inner peripheral wall (lower inner peripheral wall shown in FIG. 7) of the bulb fitting opening 45*a*.

Further, to one inner side surface (side surface on the right in FIG. 7) of the positioning notch 34 opposed to one side wall 29*a* of the positioning rib 29 is applied a pressing/biasing force in locking direction (clockwise in FIG. 7) by the bulb pressing piece 93. This causes the other inner side surface opposite to the one inner side surface (side surface on the left in FIG. 7) to be always pressed against the other side wall 29*b* of the positioning rib 29 along locking direction.

The plug 30 of the discharge bulb 23 pressed and biased along two directions, that is, in the radial direction and circumferential direction of the bulb fitting opening 45*a* is reliably positioned in predetermined position of the bulb fitting opening 45*a* without variations in the fitting position.

Despite the clearance between the positioning rib 29 and the positioning notch 34, the plug 30 of the discharge bulb 23 fitted to the bulb fitting opening 45*a* is positioned in circumferential direction while the other inner surface of the positioning notch 34 is always pressed against the other side wall 29*b* of the positioning rib 29. When the connector 50 is rotated in locking direction, the discharge bulb 23 is prevented from being rotated together by the positioning rib 29.

Then, the tips of two branches of the retainer spring 32 rotatably supported by the peripheral wall 26 are engaged to the hooks 95 of the elastic contact member 90. This brings two branches of the retainer spring 32 into elastic contact with the rear surface of the flange 33 of the plug 30. The elastic pressing force brings the plug 30 into elastic contact with the rear surface of the reflector 45 thereby fixedly supporting the discharge bulb 23 on the reflector 45.

Next, the connector 50 is fittingly attached to the plug 30 of the discharge bulb 23. The connector 50 is inserted from the rear of the plug 30 in fitting direction to bring the front surface of the contact part 56 arranged on the peripheral surface of the metallic cover 53 covering the connector 50 into contact with the terminal contact part 92 of the elastic contact member 90.

The connector 50 is rotated in locking direction (clockwise in FIG. 6) to bring the peripheral surface of the contact part 57 of the metallic cover 53 covering the connector 50 into contact with the terminal contact part 72 of the elastic contact member 70.

This electrically connects the metallic cover 53 to the elastic contact members 90, 70.

The bulb pressing piece 93 arranged on the elastic contact member 90 presses and biases the plug 30 of the discharge bulb 23 downward toward the opposing inner peripheral wall of the bulb fitting opening 45*a*. The other inner side surface of the positioning notch 34 is pressed against the other side wall 29*b* of the opposing positioning rib 29. When the connector 50 is fitted to the plug 30 of the discharge bulb 23 and rotated in locking direction, the discharge bulb 23 fitted to the bulb fitting opening 45*a* is prevented from being rotated together and is thus unlikely to be displaced from a predetermined position.

This prevents the discharge bulb 23 from being rotated together with the connector 50 and being displaced from a predetermined position and also prevents variations in the light distribution from the vehicle lighting apparatus 200.

The bulb pressing piece 93 is integrally formed with the elastic contact member 90 having a terminal contact part 92, which prevents an increase in the number of parts in the vehicle lighting apparatus and corresponding cumbersome assembly work.

As a result, it is possible to provide an excellent vehicle lighting apparatus 200 capable of effectively shielding noise generated when the discharge bulb 23 is turned on and preventing possible variations in the light distribution.

Figure 9:
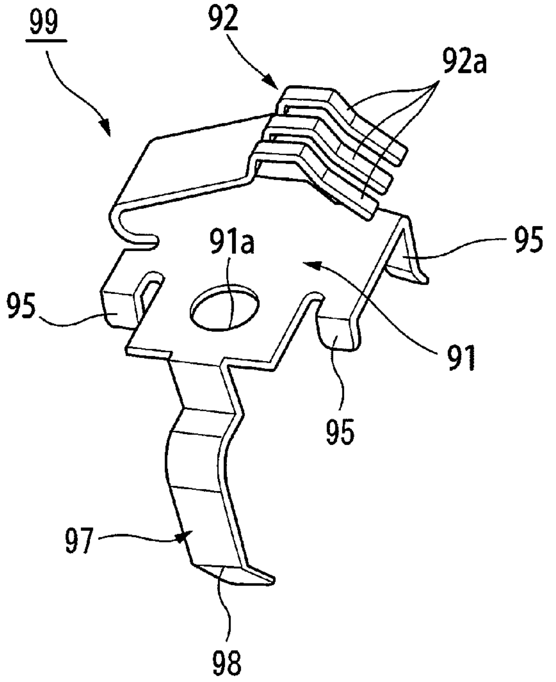
FIG. 9 is a general perspective view showing a variation of the elastic contact member shown in FIG. 8.

The bulb pressing piece 93 of the elastic contact member 90 protrudes in the radial direction of the bulb fitting opening 45*a* and has the shape of a cantilever with its tip bent in locking direction. Instead, a cantilever shape having a bent part 98 may be employed where the tip is bent toward the positioning rib 29 such as the shape of the bulb pressing piece 97 of the elastic contact member 99 shown in FIG. 9.

Figure 10:
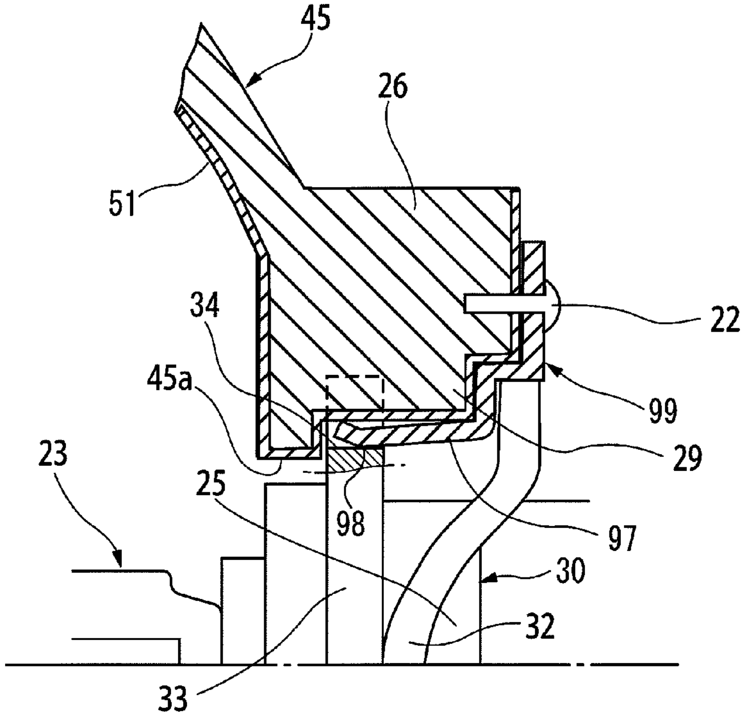
FIG. 10 is an enlarged cross-sectional view of key parts illustrating an operation of the elastic contact member shown in FIG. 9.

As shown in FIG. 10, with the bulb pressing piece 97 of the elastic contact member 99, the plug 30 of the discharge bulb 23 is inserted into the bulb fitting opening 45*a* to bring the bent part 98 of the bulb pressing piece 97 into elastic contact with the bottom surface of the positioning notch 34 and press the tip against the inner surface wall of the positioning rib 29.

Compared with a bulb pressing piece in the shape of a simple cantilever, the bulb pressing piece 97 in the shape of a cantilever including the bent part 98 has an increased pressing force to press and bias the plug 30 of the discharge bulb 23 toward the opposing inner peripheral wall of the bulb fitting opening 45*a*. The tip of the bulb pressing piece 97 is elastically deformed after contact with the positioning rib 29 to accommodate variations in the dimension of the discharge bulb 23.

Figure 11:
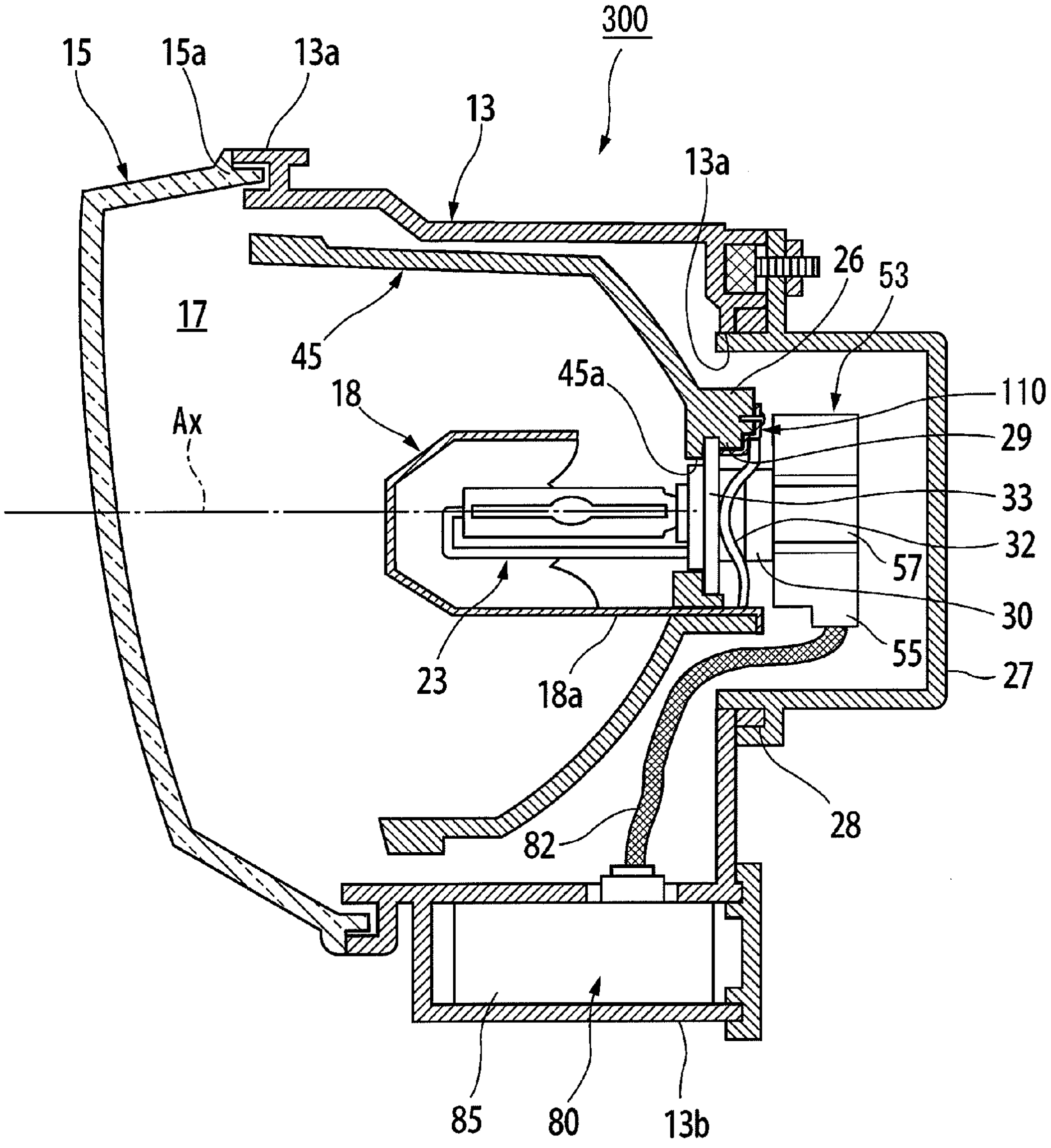
FIG. 11 is a vertical cross-sectional view of a vehicle lighting apparatus according to a third embodiment of the invention.
Figure 12:
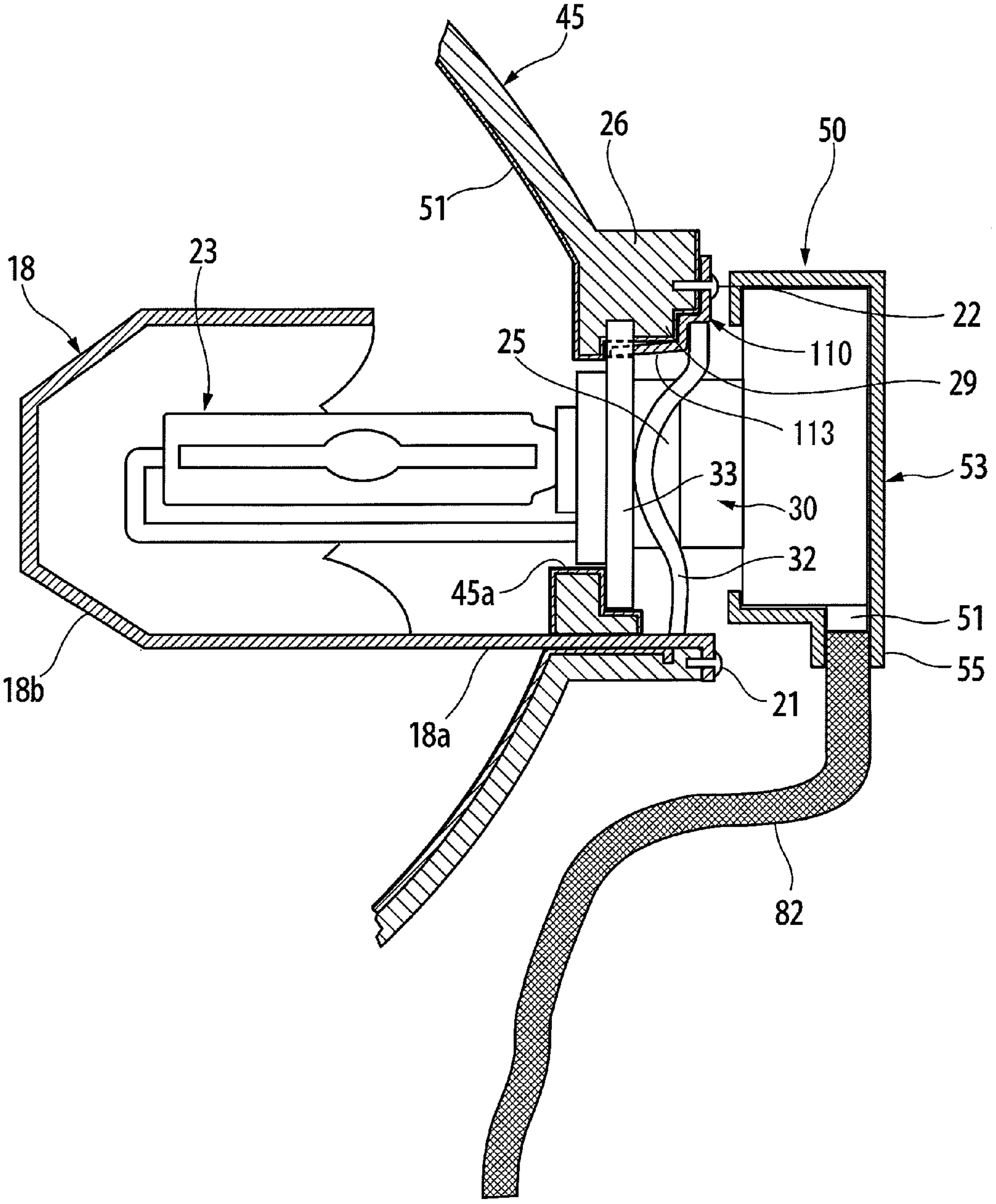
FIG. 12 is an enlarged view of key parts of the vehicle lighting apparatus shown in FIG. 11.
Figure 13:
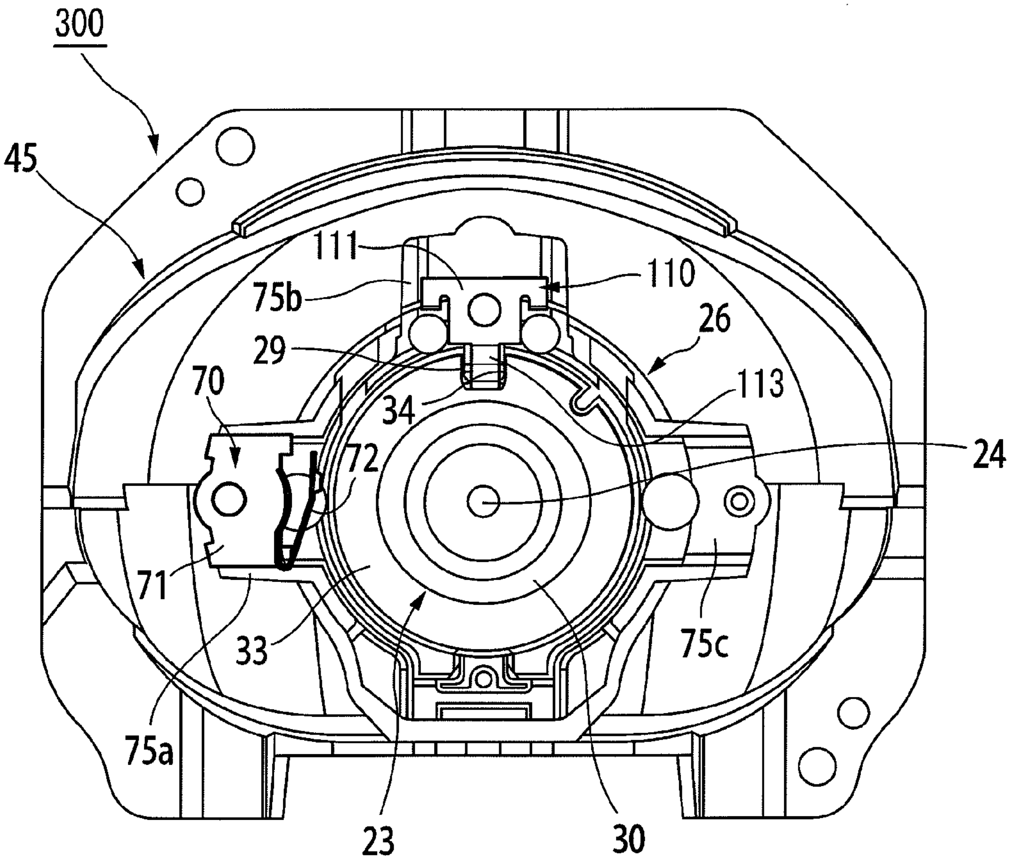
FIG. 13 is a rear view of the vehicle lighting apparatus shown in FIG. 11 to which a discharge bulb is fitted.
Figure 14:
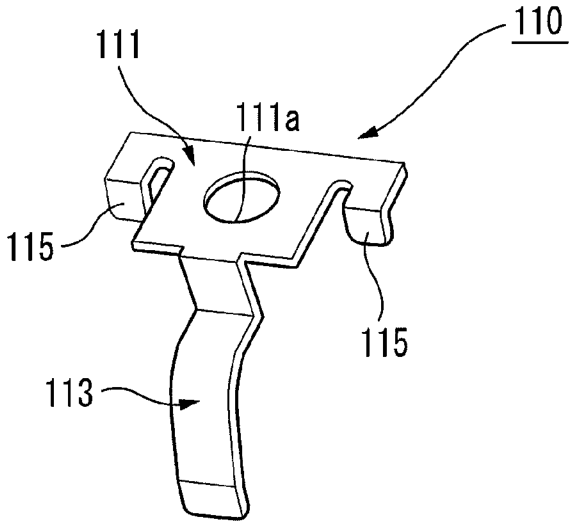
FIG. 14 is a general perspective view of the elastic contact member shown in FIG. 13.

FIG. 11 is a vertical cross-sectional view of a vehicle lighting apparatus according to a third embodiment of the invention. FIG. 12 is an enlarged view of key parts of the vehicle lighting apparatus shown in FIG. 11. FIG. 13 is a rear view of the vehicle lighting apparatus shown in FIG. 11 to which a discharge bulb is fitted. FIG. 14 is a general perspective view of the elastic contact member shown in FIG. 13. Note that a vehicle lighting apparatus 300 according to the third embodiment has the same configuration as that of the vehicle lighting apparatus 100 according to the first embodiment except that an elastic contact member 110 is used instead of the elastic contact member 60, so that the same member is given the same sign and corresponding details are is omitted.

As shown in FIG. 14, the elastic contact member 110 according to this embodiment is made by machining a metallic plate having spring characteristics. The elastic contact member 110 includes a terminal fixing part 111 fixed on the conductive film 51 of the peripheral wall 26, hooks 115 respectively protruding downward from both sides of the terminal fixing part 111, and a bulb pressing piece 113 for pressing and biasing a plug 30 toward the opposing inner peripheral wall of the bulb fitting opening 45*a*.

On the elastic contact member 110, while the terminal fixing part 111 is fixed on the peripheral wall 26 with the screw 22 penetrating the screw hole 111*a*, the bulb pressing piece 113 protrudes in the radial direction of the bulb fitting opening 45*a* and is bent in a substantially L shape in the direction of the optical axis Ax.

As shown in FIG. 13, the elastic contact member 110 according to this embodiment is fitted to a fitting part 75*b* positioned in the upper part of the peripheral wall 26 among the three fitting parts 75*a*, 75*b* and 75*c* arranged on the peripheral wall 26 of the reflector 45.

Adjacent to the fitting part 75*b* is a positioning rib 29 arranged in the bulb fitting opening 45*a* in order to position the discharge bulb 23 in circumferential direction. The elastic contact member 110 is arranged near the positioning rib 29.

The bulb pressing piece 113 of the elastic contact member 110 extends along the inner surface wall of the positioning rib 29 extending along the axis of the bulb fitting opening 45*a* and presses and biases the plug 30 of the discharge bulb 23 along the protruding direction of the positioning rib 29 protruding radially inward.

An upper contact part 56 is not formed on the peripheral side wall of the metallic cover 53 in the vehicle lighting apparatus 300 according to this embodiment. Only left and right contact parts 57 are formed in a convex shape bulging outward in radial direction.

Next, the procedure for assembling the discharge bulb 23 to the vehicle lighting apparatus 300 according to the third embodiment will be described.

On the vehicle lighting apparatus 300 described above also, when the discharge bulb 23 is inserted into the bulb fitting opening 45*a* from the rear side of the reflector 45, the discharge bulb 23 is positioned in circumferential direction by a pair of inner side surfaces of the positioning notch 34 opposed to both side walls of the positioning rib 29.

To the bottom surface of the positioning notch 34 opposed to the inner surface wall of the positioning rib 29 is applied a pressing/biasing force downward as shown in FIG. 13 by the bulb pressing piece 113 arranged on the elastic contact member 110. The plug 30 of the discharge bulb 23 is thus pressed and biased toward the opposing inner peripheral wall (lower inner peripheral wall shown in FIG. 13) of the bulb fitting opening 45*a*.

When the connector 50 is fitted to the plug 30 of the discharge bulb 23, the connector 50 is rotated in locking direction to being the peripheral surface of the contact part 57 of the metallic cover 53 covering the connector 50 into contact with the terminal contact part 72 of the elastic contact member 70. This brings the metallic cover 53 in electric connection to the elastic contact member 70.

The bulb pressing piece 113 arranged on the elastic contact member 110 presses and biases the plug 30 of the discharge bulb 23 downward toward the opposing inner peripheral wall of the bulb fitting opening 45*a*. When the connector 50 is fitted to the plug 30 of the discharge bulb 23 and rotated in locking direction, the discharge bulb 23 fitted to the bulb fitting opening 45*a* is prevented from being rotated together and is thus unlikely to be displaced from a predetermined position.

This prevents the discharge bulb 23 from being rotated together with the connector 50 and being displaced from a predetermined position and also prevents variations in the light distribution from the vehicle lighting apparatus 300.

The elastic contact member 110 according to this embodiment does not include a terminal contact part to come into contact with the front surface of the metallic cover in an elastically deformed state. As shown in FIGS. 11 and 12, a convex contact part bulging radially outward is not formed in the upper part of the peripheral wall of the corresponding metallic cover 53.

This configuration provides a compact upper part of the connector 50 covered by the metallic cover 53. When a light distribution variable mechanism such as the AFS (Adaptive Front-lighting System) is added to the vehicle lighting apparatus 300, the metallic cover 53 of the connector 50 that swivels together with the reflector 45 is unlikely to interfere with another member such as a leveling actuator.

It is thus possible to provide an excellent vehicle lighting apparatus 300 capable of effectively shielding noise generated when the discharge bulb 23 is turned on and preventing possible variations in the light distribution.

Configuration of a discharge bulb, a connector, a reflector, a shield part, an elastic contact member, a bulb pressing piece, a positioning notch or a positioning rib is not limited to that described in the foregoing embodiments and a variety of other configurations may be employed based on the spirit of the invention.

For example, while elastic contact members 60 (90; 110), 70 are arranged on two fitting parts 75*a*, 75*b* among the three fitting parts 75*a*, 75*b*, 75*c* arranged on the peripheral wall 26 of the reflector 45 in the vehicle lighting apparatus 100, 200, 300 according to the above embodiments, an elastic contact member 70 maybe added to the fitting part 75*c* or further elastic contact members may be arranged.

While each of the vehicle lighting apparatus 100, 200, 300 according to the above embodiments is a headlamp unit forming a high-beam light distribution pattern, a vehicle lighting apparatus of the invention is not limited thereto but may form a low-beam light distribution pattern.

While description has been made in connection with specific exemplary embodiment of the invention, it will be obvious to those skilled in the art that various changes and modification maybe made therein without departing from the present invention. It is aimed, therefore, to cover in the appended claims all such changes and modifications falling within the true spirit and scope of the present invention.

DESCRIPTION OF REFERENCE NUMERALS AND SIGNS

23: Discharge bulb
26: Peripheral wall
29: Positioning rib
30: Plug
32: Retainer spring
33: Flange
34: Positioning notch
45: Reflector
45*a*: Bulb fitting opening
50: Connector
51: Conductive film (first shield part)
53: Metallic cover (second shield part)
60: Elastic contact member
61: Terminal fixing part
62: Terminal contact part
63: Bulb pressing piece
65: Hook
81: High voltage cord
82: Shield cylinder
100: Vehicle lighting apparatus
Ax: Optical axis

What is claimed is:

1. A vehicle lighting apparatus comprising:
- a discharge bulb fixed to a reflector;
- a connector coupled to a plug of the discharge bulb and configured to feed power to the discharge bulb; and
- a bulb pressing piece provided on the reflector and configured to press and bias the plug in a radial direction of the plug toward an opposing inner peripheral wall of a bulb fitting opening of the reflector to which the bulb fits.

2. The vehicle lighting apparatus according to claim 1, further comprising:
- a first shield part made of a conductive material and provided on the reflector around the bulb fitting opening;
- a second shield part made of a conductive material and provided on the connector to cover a periphery of the connector; and

- an elastic contact member made of a conductive material and provided on the first shield part to be electrically connected with the second shield part;
- wherein the bulb pressing piece is arranged on the elastic contact member.

3. The vehicle lighting apparatus according to claim 1, wherein the bulb pressing piece is arranged in a vicinity of a positioning rib arranged in the bulb fitting opening and fits to a positioning notch of the discharge bulb, to position the discharge bulb in circumferential direction.

4. The vehicle lighting apparatus according to claim 3, wherein the bulb pressing piece presses and biases the inner side surface of the positioning notch in a locking direction of the connector.

5. The vehicle lighting apparatus according to claim 2, wherein the elastic contact member includes:
- a terminal fixing part fixed to the first shield part; and
- a terminal contact part in contact with the second shield part in an elastically deformed state, and
- wherein the terminal contact part includes a plurality of flexible pieces respectively having contacts at tips thereof.

6. The vehicle lighting apparatus according to claim 3, wherein the bulb pressing piece includes a bent part whose tip is bent toward the positioning rib.

7. The vehicle lighting apparatus according to claim 4, wherein the bulb pressing piece includes a bent part whose tip is bent toward the positioning rib.

8. The vehicle lighting apparatus according to claim 1, further comprising:
- a retainer spring that holds the plug against a rear surface of the reflector.

9. A vehicle lighting apparatus comprising:
- a discharge bulb fixed to a reflector;
- a connector coupled to a plug of the discharge bulb and configured to feed power to the discharge bulb;
- a bulb pressing piece provided on the reflector and configured to press and bias the plug toward an opposing inner peripheral wall of a bulb fitting opening of the reflector to which the bulb fits;
- a first shield part made of a conductive material and provided on the reflector around the bulb fitting opening;
- a second shield part made of a conductive material and provided on the connector to cover a periphery of the connector; and
- an elastic contact member made of a conductive material and provided on the first shield part to be electrically connected with the second shield part;
- wherein the bulb pressing piece is arranged on the elastic contact member.

10. A vehicle lighting apparatus comprising:
- a discharge bulb fixed to a reflector;
- a connector coupled to a plug of the discharge bulb and configured to feed power to the discharge bulb; and
- a bulb pressing piece provided on the reflector and configured to press and bias the plug toward an opposing inner peripheral wall of a bulb fitting opening of the reflector to which the bulb fits,
- wherein the bulb pressing piece is arranged in a vicinity of a positioning rib arranged in the bulb fitting opening and fits to a positioning notch of the discharge bulb, to position the discharge bulb in circumferential direction.

11. The vehicle lighting apparatus according to claim 10, wherein the bulb pressing piece presses and biases the inner side surface of the positioning notch in a locking direction of the connector.

12. The vehicle lighting apparatus according to claim 10, wherein the elastic contact member includes:

a terminal fixing part fixed to the first shield part; and a terminal contact par in contact with the second shield part in an elastically deformed state, and wherein the terminal contact part includes a plurality of flexible pieces respectively having contacts at tips thereof.

13. The vehicle lighting apparatus according to claim 10, wherein the bulb pressing piece includes a bent part whose tip is bent toward the positioning rib.

14. The vehicle lighting apparatus according to claim 11, wherein the bulb pressing piece includes a bent part whose tip is bent toward the positioning rib.

* * * * *